POLE PIECE FOR MAGNETIC RECORDING HEAD
Filed April 9, 1965
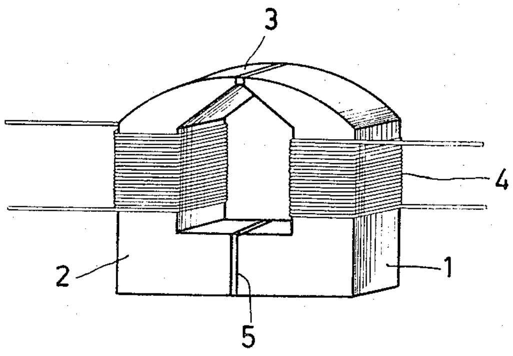
INVENTORS
WILLEM NOORLANDER
JAN BERTUS THIJSSEN
BY
Frank R. Trifari
AGENT 3,376,397

POLE PIECE FOR MAGNETIC RECORDING HEAD

Willem Noorlander and Jan Bertus Thijssen, Emmasingel, Eindhoven, Netherlands, assignors to North American Philips Company, Inc., New York, N.Y., a corporation of Delaware Filed Apr. 9, 1965, Ser. No. 446,828
Claims priority, application Netherlands, Apr. 22, 1964, 64—4,372
10 Claims. (Cl. 179—100.2)

Our invention relates to an arrangement comprising a body of sintered oxidic ferromagnetic material which is joined to a body consisting of non-magnetizable material.

More particularly the invention relates to pole piece units employed in magnetic heads for magnetically recording, reproducing and/or erasing information in a track of a magnetic record carrier, e.g., audio and video signals. Such heads usually consist of a sintered oxidic ferromagnetic pole-piece unit consisting of at least two parts separated by at least one useful gap filled with non-magnetizable material along which the magnetic record carrier is moved, and of a rear yoke which is preferably also made of sintered oxidic ferromagnetic material and which is connected to this unit so that each useful gap forms part of an annular ferromagnetic circuit.

The pole pieces of such magnetic heads are generally narrow; the gaps of the heads have a small height and a small width. As a result, a magnetic head manufactured with the use of a known sintered oxidic ferromagnetic material cannot be subjected to comparatively large mechanical forces either during manufacture, or when used at the area of the gap without disadvantageous consequences, unless additional precautions of a structural nature have been taken.

A great variety of attempts have been made to obtain magnetic heads having such narrow pole pieces and annular gaps of small height and width. Efforts were made to prevent those parts from being subjects to comparatively large mechanical forces during the manufacturing process and to impart a mechanical strength to the assembly such that a long life could be obtained notwithstanding the fact that during operation a tape (magnetic record carrier) rubbed along the pole pieces at the area of the gap.

If it is desired to increase the mechanical strength of the magnetic head, a connecting beam of non-magnetizable material may be provided between the parts of the generally U-shaped pole piece unit. Such a transverse beam may be secured to the ferromagnetic material, for example, by means of glass. For this purpose, and generally also in order to fill the useful (effective gap) with glass, the assembly must be heated at high temperature (for example, to approximately 700° C.). In order to prevent great forces from being exerted on the pole piece unit at the area of the effective gap or on the joint between the pole pieces and the connecting beam upon cooling, the value of the coefficient of expansion of the material used for this beam should be approximately equal to that of the expansion coefficient of the sintered oxidic ferromagnetic material of which the pole pieces are made. Moreover, the variation of the expansion coefficient with temperature (referred to hereinafter as expansion curve), should be substantially the same for both materials.

In practice, a difficulty arises in that for the manufacture of pole piece units for magnetic heads different sintered oxidic ferromagnetic materials are used for each individual case, the expansion coefficients of these materials having more or less different values. In each individual case, the value of the expansion coefficient of the material for the connecting beam must be chosen so as to be approximately equal to that of the expansion coefficient of the ferromagnetic material used, while in each individual case the shapes of the expansion curves for both materials must correspond with one another.

For mass production (manufacture), it is of importance that in each case materials of the same kind are available for the connecting beam. Consequently, it is not only necessary that in a given case the expansion coefficient of the material selected for the said connecting beam has a given absolute value when other ferromagnetic materials are used having expansion coefficients which are different from those of the materials used in the said given case, but also that in these cases materials of the same kind are available for the connecting beam the coefficients of expansion of which are matched to those of the ferromagnetic materials to be used.

In multiple magnetic heads which are known per se, the pole piece units are generally joined to each other by plates of non-magnetizable electrically conductive material, by plates of non-magnetizable electrically conductive material and by plates of ferromagnetic material. These plates, and more particularly the plates made of non-magnetizable electrically non-conductive material are located, shaped and arranged so that during operation the magnetic record carriers also move along a boundary surface of these plates. This generally requires that a mating face of the magnetic head and the boundary face of the plate of non-magnetizable electrically non-conductive material are accurately coplanar to each other. Consequently, the material used for those plates must exhibit inter alia the same workability as the ferromagnetic material of the pole pieces, while its resistance to wear must be substantially equal to that of the last-mentioned material.

We have found that if it should be desirable to use a ferromagnetic ferrite as the ferromagnetic material, there is no material available among the materials used or suggested for structural purposes which fulfills the above requirements.

We have found quite unexpectedly that a dielectric material having a comparatively high dielectric constant, but heretofore having no known structural utility, is very suitable as a non-magnetizable electrically non-conductive material for the above described purposes.

Thus, in accordance with the invention a body of sintered oxidic ferromagnetic material is joined to a body consisting of a non-magnetizable electrically non-conductive material consisting of $Ba_2Ti_9O_{20}$ and/or a compound according to the formula $(Ba_uQ_v)(Ti_xR_y)O_{20}$, in which formula Q and R represent metal atoms and $u+v\cong2$ and $x+y\cong9$. The elements Q and R and the values of $u$, $v$, $x$ and $y$ are chosen so that a compound according to the above formula has the crystal structure of $Ba_2Ti_9O_{20}$, or of a material which consists of a mixture of at least 30% by weight of $Ba_2Ti_9O_{20}$ and/or a compound according to the said formula and the remainder of compounds coexisting with these compounds in the systems of the oxides which compose these compounds or of a mixture thereof.

The invention relates in particular to arrangements in which as a sintered oxidic ferromagnetic material a ferromagnetic ferrite is used and especially to magnetic heads, for example, single or multiple heads, for recording, reproducing and/or erasing magnetic recordings of audio and video signals, the individual heads having a magnetic circuit which consists of sintered ferromagnetic ferrite.

Use may be made of a ferromagnetic ferrite of known composition. Thus, a nickel-zinc ferrite is very suitable.

We have used, for example, three different nickel-zinc ferrites the composition of which in mol percent are:

Ferrite 8Bl: NiO, 15.1; ZnO, 35.2; and $Fe_2O_3$, 49.7;
Ferrite 8Cl: NiO, 18.1; ZnO, 32.2; and $Fe_2O_3$, 49.7;
Ferrite 8Dl: NiO, 25.1; ZnO, 25.1; and $Fe_2O_3$, 49.8.

The compound $Ba_2Ti_9O_{20}$ can be formed only with difficulty from a mixture consisting solely of BaO and $TiO_2$. The addition of $SnO_2$, $ZrO_2$ or SrO promotes the formation of the said compound; ZnO has the same effect while CaO does not promote the formation of $Ba_2Ti_9O_{20}$.

In the system BaO—$TiO_2$—$ZrO_2$, the compound $Ba_2Ti_9O_{20}$ occurs in a few areas comprising two phases and in a few areas comprising three phases. Furthermore, this compound coexists in the system with the composing oxides. Thus, in the two-phase areas it exists as $$Ba_2Ti_9O_{20}+TiO_2$$

and $Ba_2Ti_9O_{20}+BaTi_4O_9$. In the three-phase areas it exists as $Ba_2Ti_9O_{20}+TiO_2+ZrTiO_4$, $Ba_2Ti_9O_{20}+ZrTiO_4+ZrO_2$ and $Ba_2Ti_9O_{20}+BaTi_4O_9+ZrO_2$.

It should be noted that the compounds $TiO_2$, $Ba_2Ti_9O_{20}$ and $BaTi_4O_9$ also may include compounds in which Ti is replaced in part by Zr without causing a transition to another crystal structure. In the case of $Ba_2Ti_9O_{20}$, this may be indicated as $Ba_2(Ti_xZr_y)O_{20}$, in which formula $x+y=9$ and $x$ may vary from 9 to 8.5 and $y$ from 0 to 0.5. Thus, the formula for these compounds may be designated $Ba_2(Ti_{9-8.5}Zr_{0-0.5})O_{20}$.

In the system BaO—$TiO_2$—$SnO_2$, the compound $Ba_2Ti_9O_{20}$ occurs in the two-phase areas as:

$$Ba_2Ti_9O_{20}+TiO_2$$

$Ba_2Ti_9O_{20}+BaTi_4O_9$ and $Ba_2Ti_9O_{20}+SnO_2$ and in the three-phase areas as: $Ba_2Ti_9O_{20}+TiO_2+SnO_2$ and $$Ba_2Ti_9O_{20}+BaTi_4O_9+SnO_2$$

$TiO_2$ and $Ba_2Ti_9O_{20}$, $BaTi_4O_9$ and $SnO_2$ may also include compounds in which Ti is partly replaced by Sn and Sn is partly replaced by Ti, respectively, without causing a transition to another crystal structure. In the case of $Ba_2Ti_9O_{20}$, this may be designated by the formula $Ba_2(Ti_{9-8.25}Sn_{0-0.75})O_{20}$.

In the system BaO—SrO—$TiO_2$, it has been found that the compound $Ba_2Ti_9O_{20}$ in the system of the composing oxides beside the compounds coexisting with the compound occurs in the two-phase areas $Ba_2Ti_9O_{20}+TiO_2$, $Ba_2Ti_9O_{20}+BaTi_4O_9$ and $Ba_2Ti_9O_{20}+(Ba, Sr)TiO_3$ and in the three-phase areas $Ba_2Ti_9O_{20}+TiO_2+SrTiO_3$ and $Ba_2Ti_9O_{20}+(Ba, Sr)TiO_3+BaTi_4O_9$.

$Ba_2Ti_9O_{20}$ and $Ba_2Ti_4O_9$ may also include compounds in which Ba is partly replaced by Sr, the crystal structure of these compounds also being maintained, however. In the case of $Ba_2Ti_9O_{20}$, this may be designated by the formula $(Ba_{2-1.94}Sr_{0-0.06})Ti_9O_{20}$.

In the system BaO—$TiO_2$—ZnO, the compound $Ba_2Ti_9O_{20}$ occurs in the two-phase areas $Ba_2Ti_9O_{20}+TiO_2$ and $Ba_2Ti_9O_{20}+BaTi_4O_9$ and in the three-phase area $Ba_2Ti_9O_{20}+BaTi_4O_9+TiO_2Ba_2Ti_9O_{20}$ and $BaTi_4O_9$ may also include solid solutions of $Ba_2Ti_9O_{20}$ and ZnO and of $BaTi_4O_9$ and ZnO in which the structures of $Ba_2Ti_9O_{20}$ and $BaTi_4O_9$, respectively have been preserved. In the case of $Ba_2Ti_9O_{20}$, the content of ZnO in the said solid solutions may vary up to 1 mol percent while preserving the structure of $Ba_2Ti_9O_{20}$.

As a non-magnetizable, electrically non-conductive material in accordance with the invention, a material may be employed which consists principally of $Ba_2Ti_9O_{20}$ and/or a compound according to the formula $(Ba_uQ_v)$ $$(Ti_xR_y)O_{20}$$

in which formula Q, R, $u$, $v$, $x$ and $y$ have the aforesaid meanings and are chosen so that a compound according to the said formula exhibits the crystal structure of $Ba_2Ti_9O_{20}$. Alternatively a material may be employed which consists principally of a mixture of at least 30% by weight of $Ba_2Ti_9O_{20}$ and/or a compound according to the said formula and the remainder of which consists of compounds coexisting in the systems of the composing oxides with this compound or of a mixture thereof.

A particularly suitable non-magnetizable electrically non-conductive material in accordance with the invention is a material which consists principally of a compound having the crystal structure of $Ba_2Ti_9O_{20}$ according to the formula $Ba_2(Ti_xR_y)O_{20}$, in which formula $x+y=9$. Alternatively, the material may consist of a mixture of this compound with $TiO_2$ or with a compound according to the formula $(Ti_pR_q)O_2$, in which formula R represents zirconium or tin. In the latter case if R represents zirconium $x=9.0–8.5$, $y=0–0.5$, $p=1.0–0.9$ and $q=0–0.1$. If, in the latter case R represents tin, $x=9.0–8.4$, $y=0–0.6$, $p=1.0–0.75$ and $q=0–0.25$. More particularly, a material may be employed which consists principally of a mixture of a compound according to the formula $$Ba_2Ti_{9-8.5}Zr_{0-0.5})O_{20}$$

and a compound according to the formula $$(Ti_{1.0-0.75}Zr_{0-0.25})O_2$$

the content of the first mentioned compound being at least 50% by weight.

We have manufactured excellent magnetic heads employing for example, the aforementioned ferrites 8Bl, 8Cl and 8Dl in which as non-magnetizable electrically non-conductive materials we have used sintered products of respectively the following compositions (the numbers denote mol percent:

| BaO | $TiO_2$ | $ZrO_2$ |
|---|---|---|
| 9.3 | 88 | 2.7 |
| 10.8 | 86 | 3.2 |
| 14.7 | 81 | 4.3 |

After a particular ferromagnetic ferrite has been chosen for the manufacture of the magnetic heads, the choice of a suitable non-magnetizable electrically non-conductive material according to the invention may be facilitated in that the expansion coefficients of both materials are ascertained by means of the method described in "Sprechsall für Keramik-Glas-Email," volume 95, 464–7, 484–7 (1962) and volume 96, 36–9 (1963).

The invention will be described with reference to the accompanying drawing, the sole figure of which shows a magnetic head for recording, reproducing, and/or erasing a signal on a magnetic carrier which traverses the gap in the head.

The head shown comprises two halves 1 and 2 which are spaced apart to form a gap 3 over which a magnetic record carrier (not shown), e.g., a tape whose surface is coated with a magnetic material which stores information in the form of magnetized particles, passes. A winding 4, to which an electrical signal can be applied, or from which an electrical signal can be derived, is wound about the two halves of the transducer. The two halves of the transducer are joined both at gap 3 and at a gap 5 at the rear by the dielectric material described hereinabove.

While we have described our invention with reference to particular examples and applications thereof, other modifications will be obvious to those skilled in the art without departing from the spirit and scope thereof which is defined in the appended claims.

What we claim is:

1. As an article of manufacture a body of sintered oxidic ferromagnetic material which is joined to a body consisting of a non-magnetizable electrically non-conductive material consisting of at least 30% by weight of a compound having the formula $(Ba_uQ_v)(Ti_xR_y)O_{20}$, in which Q is an element selected from the group consisting of Sr and Zn and R is an element selected from the group consisting of Sn and Zr, $u+v\cong2$ and $x+y\cong9$, said compound having a crystal structure corresponding to that of $Ba_2Ti_9O_{20}$.

2. An article of manufacture as claimed in claim 1 in which the non-magnetizable electrically non-conductive material consists essentially of a compound having a formula $(Ba_{2.0-194}Sr_{0-0.06})Ti_9O_{20}$, said compound having a crystal structure corresponding to that of $Ba_2Ti_9O_{20}$.

3. An article of manufacture as claimed in claim 2 in which the said material is a mixture of the said compound and $TiO_2$.

4. As an article of manufacture a body of sintered oxidic ferromagnetic material which is joined to a body consisting of a non-magnetizable electrically non-conductive material consisting of a compound having the formula $Ba_2(Ti_xR_y)O_{20}$, in which formula $x+y=9$, in which R is an element selected from the group consisting of zirconium and tin, and when R is zirconium $x=9.0-8.5$, $y=0-0.5$, and when R is tin $x=9.0-8.4$, $y=0-0.6$, said compound having a crystal structure corresponding to that of $Ba_2Ti_9O_{20}$.

5. An article of manufacture as claimed in claim 4 in which the said material is a mixture of the said compound and $(Ti_pR_q)O_2$ and when R is zirconium $p=1.0-0.9$ and $q=0-0.1$ and when R is tin $p=1.0-0.75$ and $q=0-0.25$.

6. An article of manufacture as claimed in claim 5, in which the non-magnetizable electrically non-conductive material consists of a mixture of at least 50% by weight of a compound having a formula $Ba_2(Ti_{9-8.5}Zr_{0-0.5})O_{20}$ and the remainder a compound having a formula $(Ti_{1.0-0.75}Zr_{0-0.25})O_2$.

7. As an article of manufacture a body of sintered oxidic ferromagnetic material which is joined to a body consisting of a non-magnetizable electrically non-conductive material consisting principally of a solid solution of $Ba_2Ti_9O_{20}$ and ZnO in an amount not exceeding 1 mol. percent, said material having a crystal structure corresponding to that of $Ba_2Ti_9O_{20}$.

8. An article of manufacture as claimed in claim 7 in which the said material is a mixture of said solid solution and $TiO_2$.

9. A pole piece unit for use in a magnetic head for recording, reproducing and erasing magnetic recording of information, in which the magnetic head comprises a magnetic circuit composed of a sintered ferromagnetic material which is joined to a body consisting of a non-magnetizable electrically non-conductive material consisting of at least 30% by weight of a compound having the formula $(Ba_uQ_v)(Ti_xR_y)O_{20}$, in which Q is an element selected from the group consisting of Sr and Zn and R is an element selected from the group consisting of Sr and Zr, $u+v=2$ and $x+y=9$, said compound having a crystal structure corresponding to that of $Ba_2Ti_9O_{20}$.

10. A pole piece unit as claimed in claim 9 in which the sintered ferromagnetic material is a nickel-zinc ferrite.

References Cited

UNITED STATES PATENTS 3,292,062 12/1966 Gallagher et al. -------- 23—51

BERNARD KONICK, *Primary Examiner.*

J. R. GOUDEAU, *Assistant Examiner.*